United States Patent
Zhang et al.

(10) Patent No.: US 9,584,446 B2
(45) Date of Patent: Feb. 28, 2017

(54) MEMORY BUFFER MANAGEMENT METHOD AND SYSTEM HAVING MULTIPLE RECEIVE RING BUFFERS

(75) Inventors: Ronghua Zhang, Mountain View, CA (US); Pankaj Thakkar, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 1262 days.

(21) Appl. No.: 12/050,900

(22) Filed: Mar. 18, 2008

(65) Prior Publication Data

US 2009/0240793 A1 Sep. 24, 2009

(51) Int. Cl.
*G06F 15/16* (2006.01)
*H04L 12/861* (2013.01)

(52) U.S. Cl.
CPC .......... *H04L 49/9042* (2013.01); *H04L 49/90* (2013.01); *H04L 49/9031* (2013.01); *H04L 49/9052* (2013.01)

(58) Field of Classification Search
USPC .................................................. 709/230–237
See application file for complete search history.

(56) References Cited

U.S. PATENT DOCUMENTS

| | | | | |
|---|---|---|---|---|
| 5,361,372 A | * | 11/1994 | Rege et al. | 709/234 |
| 5,574,861 A | * | 11/1996 | Lorvig et al. | 709/226 |
| 5,751,951 A | * | 5/1998 | Osborne et al. | 709/250 |
| 5,778,180 A | | 7/1998 | Gentry et al. | |
| 5,784,649 A | * | 7/1998 | Begur et al. | 710/52 |
| 5,838,904 A | * | 11/1998 | Rostoker et al. | 709/250 |
| 5,913,042 A | * | 6/1999 | Shemla et al. | 370/429 |
| 6,134,596 A | * | 10/2000 | Bolosky et al. | 709/233 |
| 6,240,065 B1 | * | 5/2001 | Medina et al. | 370/229 |
| 6,247,060 B1 | * | 6/2001 | Boucher et al. | 709/238 |
| 6,421,730 B1 | * | 7/2002 | Narad et al. | 709/236 |
| 6,484,207 B1 | * | 11/2002 | Petersen et al. | 709/232 |
| 6,526,452 B1 | * | 2/2003 | Petersen et al. | 709/251 |
| 6,584,109 B1 | * | 6/2003 | Feuerstraeter et al. | 370/401 |
| 6,650,640 B1 | * | 11/2003 | Muller et al. | 370/392 |
| 6,675,222 B1 | * | 1/2004 | Petersen et al. | 709/232 |
| 6,678,278 B2 | * | 1/2004 | Medina et al. | 370/412 |
| 6,735,218 B2 | * | 5/2004 | Chang et al. | 370/471 |
| 6,859,841 B2 | * | 2/2005 | Narad et al. | 709/236 |
| 7,012,926 B2 | | 3/2006 | Weng et al. | |
| 7,336,674 B2 | * | 2/2008 | Medina et al. | 370/412 |
| 7,400,581 B2 | * | 7/2008 | Masputra et al. | 370/230 |
| 7,515,612 B1 | * | 4/2009 | Thompson | 370/474 |

(Continued)

OTHER PUBLICATIONS

NetXen, Inc., "Ethernet Driver Reference Guide: For Open Source Software," Version 1.0, dated Apr. 5, 2006, pp. 1-36.

*Primary Examiner* — Hua Fan

(57) ABSTRACT

The present invention is directed to a method and system of memory management that features dual buffer rings, each of which includes descriptors identifying addresses of a memory space, referred to as buffers, in which portions of data packets are stored. Typically, the header segment of each data packet is stored at a first set of a plurality of buffers, and the portion of the payload segment that does not fit among the buffers of the first set is stored in the buffers of a second set. In this manner, the size of the individual buffers associated with the first buffer rings may be kept to the smallest size of useable storage space, and the buffers corresponding to the second buffer ring may be arbitrary in size.

29 Claims, 6 Drawing Sheets

(56) References Cited

U.S. PATENT DOCUMENTS

| | | | |
|---|---|---|---|
| 7,532,644 B1* | 5/2009 | Masputra et al. | 370/469 |
| 7,752,324 B2* | 7/2010 | Hamadeh et al. | 709/230 |
| 2002/0107962 A1* | 8/2002 | Richter et al. | 709/225 |
| 2002/0107971 A1* | 8/2002 | Bailey et al. | 709/231 |
| 2002/0161848 A1* | 10/2002 | Willman et al. | 709/213 |
| 2003/0046423 A1* | 3/2003 | Narad et al. | 709/238 |
| 2003/0097481 A1* | 5/2003 | Richter | 709/251 |
| 2003/0200339 A1* | 10/2003 | Greenblat et al. | 709/250 |
| 2004/0093425 A1* | 5/2004 | Thomas | 709/236 |
| 2005/0055406 A1* | 3/2005 | Singhai et al. | 709/206 |
| 2006/0015651 A1* | 1/2006 | Freimuth et al. | 709/250 |
| 2006/0168286 A1* | 7/2006 | Makhervaks et al. | 709/231 |
| 2006/0168306 A1* | 7/2006 | Makhervaks et al. | 709/232 |
| 2007/0079001 A1* | 4/2007 | Ando et al. | 709/231 |

* cited by examiner

MEMORY BUFFER MANAGEMENT METHOD AND SYSTEM HAVING MULTIPLE RECEIVE RING BUFFERS

BACKGROUND OF THE INVENTION

A substantial portion of computer systems communicate over networks using transmission of data in packetized format at very high data rates. A common network communication protocol is known as the Ethernet and transmits data packets between different computer systems at rates of 1 Gbit/second or more.

Upon receipt of a data packet a computer system typically stores the data in a packet buffer before the data is provided to the computer processes for which the data is intended. Once the data is provided to the intended processes, the packet buffer in which the data was stored are freed to accept additional data. Often, the rate at which data is received is different from the rate at which the computer system frees packet buffers to accept additional data, which may result in buffer overflow. Many attempts have been undertaken to avoid buffer overflow while avoiding use of excessive amounts of buffer memory.

In one attempt, a packet receiving-transmitting method for use on a packet-switching network, such as the Ethernet, stores each received packet in a packet buffer of a fixed size and associated with a single descriptor. Based on a threshold logical segmentation size determined by the network protocol, each packet buffer is partitioned into a plurality of segments, each having an ending point linked to an Early Receive/Transmit interrupt signal with the ending point of the packet buffer being linked to an OK interrupt signal. In response to each Early Receive/Transmit interrupt signal, the packet data stored are retrieved and forwarded; and in response to the OK interrupt signal, all the remaining packet data in the packet buffer are retrieved and forwarded. After this, a write-back operation is performed on the associated descriptor so as to reset the descriptor to unused status.

Thus, there is a need to improve management of memory used to receive data packets.

SUMMARY

A method and system of memory management includes dual buffer rings, each of which has descriptors identifying addresses of a memory space, referred to as buffers, in which portions of data packets are stored. The header segment of each data packet is stored in a first set of a plurality of buffers, and the portion of the payload segment that does not fit among the buffers of the first set is stored in the buffers of a second set of the plurality of buffers. To that end, the method includes defining a plurality of buffers; establishing a first buffer ring having a plurality of descriptors identifying a first set of the plurality of buffers, with the buffers of the first set having a first size; and defining a second buffer ring having a plurality of identifiers identifying a second set of buffers, with the buffers of the second set having a second size that is different from the first size. The system includes a memory space having first and second buffer rings with a plurality of descriptors, a first sub-group of which is contained in the first buffer ring and identifies a first set of the plurality of buffers, and a second sub-group of which is contained in the second buffer ring and identifies a second set of buffers; and a communication driver to associate the first and second sets of buffers with the first and second buffer rings so that each of the buffers of the first set has a size that is different from the size of each of the buffers of the second set. A network interface is in data communication with the communication driver; the network interface is connected to receive a data packet having a header segment and a payload segment and records, in a first descriptor of the second buffer ring, a location of the payload segment and records, in a first descriptor of the first ring, a location of the header segment and information corresponding to the first descriptor of the second buffer ring. These and other embodiments are described more fully below.

DETAILED DESCRIPTION

Figure 1:
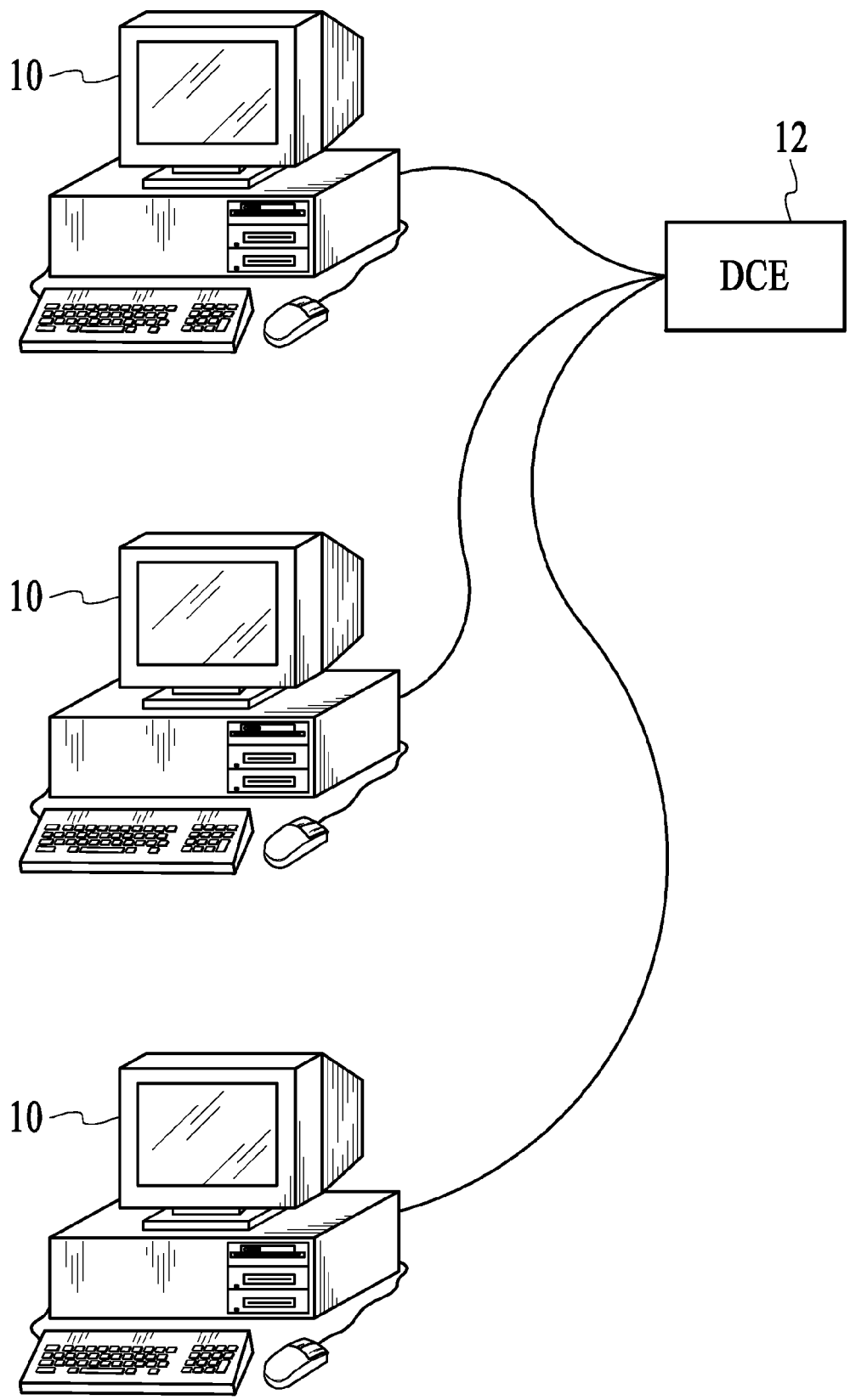
FIG. 1 is a block diagram of a computer network in which the present invention may be practiced.

Referring to FIG. 1, a network is shown that includes a plurality of networked computer systems, for example data terminal equipment 10, in data communication over one or more nodes 12. In one embodiment, node 12 comprises data communications equipment (DCE), which may be, for example, routers associated with a network. The network may be any configuration, such as a local area network (LAN), a publicly accessible network, such as a public switched telephone network over ASDL telephone lines or large bandwidth trunks, such as T1 or OC3 service more commonly associated with a wide area network, such as the Internet.

Figure 2:
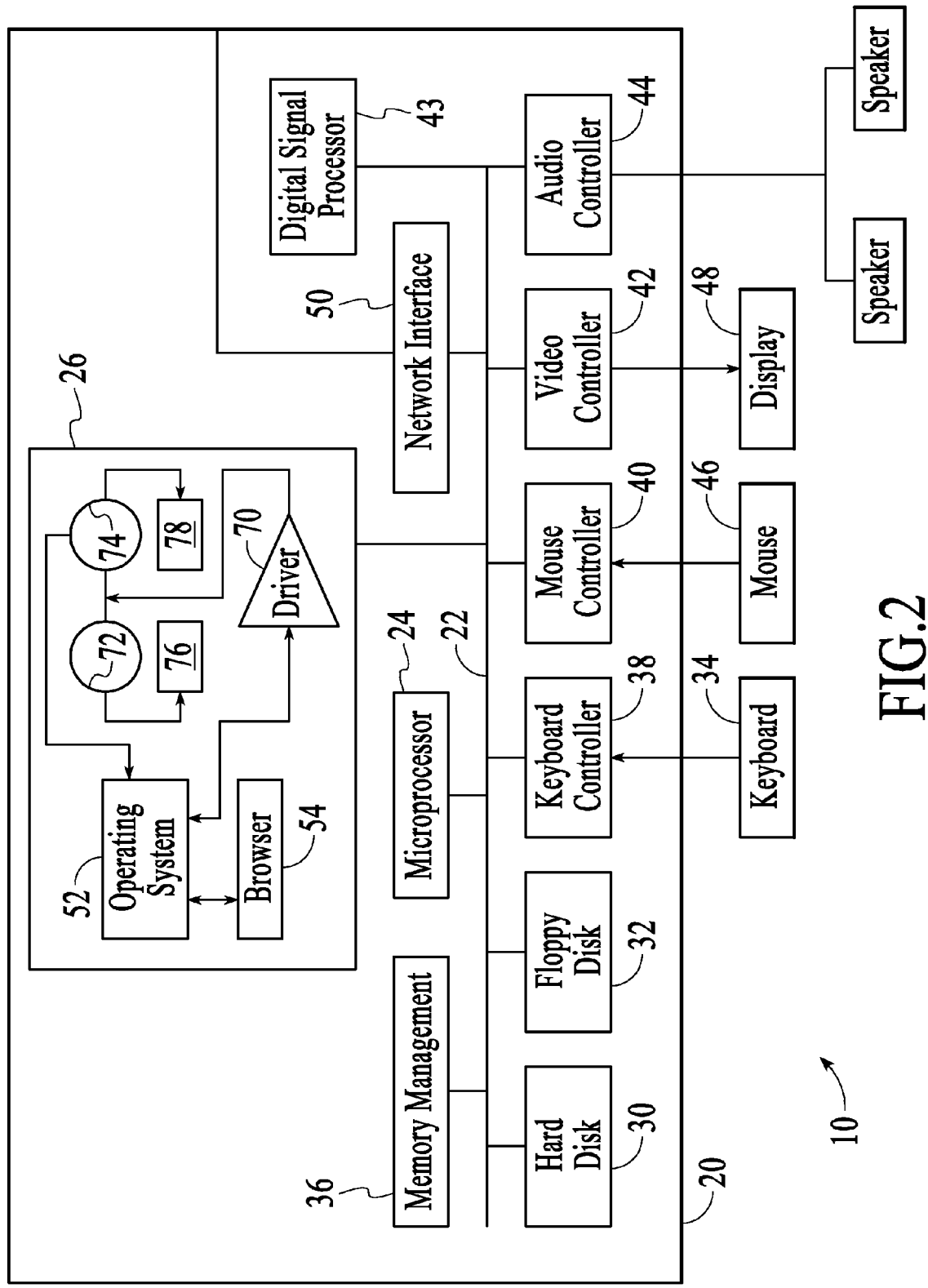
FIG. 2 is a block diagram of an example of a computing system employed in the computer network shown in FIG. 1, in accordance with the present invention.

Referring to FIG. 2, one or more of the computer systems 10 has a system unit 20 with one or more system buses 22 placing various components of the system in data communication. For example, a microprocessor 24 is placed in data communication with a memory space 26 of system unit 20 that may include read only memory (ROM), random access memory (RAM) and various register memory via the system bus 22. To that end, memory space 26 contains, among other code, an operating system 52 for controlling basic hardware operation including disk drives 30 and 32, as well as keyboard 34 and other input/output devices. In addition, application programs such as browser 54 are also loaded into memory space 26 so that a microprocessor 24 may operate upon the same.

Memory management device 36 is in data communication with the system bus 22 to control direct memory access (DMA) operations. DMA operations include passing data among memory space 26 and hard disk drive 30 and floppy disk drive 32 and network interfaces. Also in data communication with system bus 22 are various I/O controllers: a keyboard controller 38, a mouse controller 40, a video controller 42, and an audio controller 44. Keyboard controller 38 provides a hardware interface for the keyboard 34, the mouse controller 40 provides the hardware interface for a mouse 46, or other point and click device, and video controller 40 provides a hardware interface for a display 48. Operating system 52 may be a commodity operating system such as WINDOWS® XP®, or other known operating system. Browser 54 may be any of a differing number of Internet access tools, including an HTTP-compliant web browser having a JavaScript interpreter, such as FIRE-FOX®, NETSCAPE NAVIGATOR®, INTERNET EXPLORER® and the like.

Referring to both FIGS. 1 and 2, a network interface 50 enables data communication over the network facilitating data transmission speeds that are dependent upon the network protocol employed. Although network interface 50 may facilitate communication using any known protocol, such as TCP/IP, in the present example, network interface 50 facilitates communication between computer systems 10 using the Ethernet protocol, with node 12 being referred to as data communication equipment (DCE) 12 and computer systems 10 being referred to as data terminal equipment (DTE) 10. To that end, DCE 12 communicates by sending data packets, in a frame 56, shown more clearly in FIG. 3.

Figure 3:
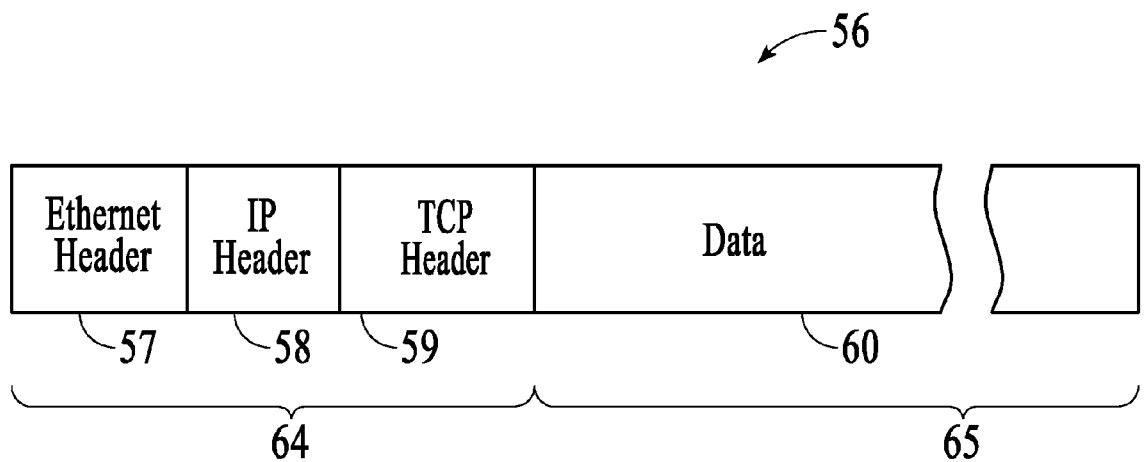
FIG. 3 illustrates a simplified plan view of an Ethernet frame in accordance with the present invention.

Referring to both FIGS. 2 and 3, an Ethernet frame 56 is shown including four segments of information, 57-60. Ethernet header segment 57 provides information to facilitate handling of frame 56 by network interface 50. Internet Protocol (IP) header segment 58 includes information to facilitate routing of frame 56 over a network. TCP header segment 59 includes information to facilitate delivery of the entire frame 56 to a destination of the network. Segments 57-59 are commonly referred to as a header segment 64 of frame 56, and segment 60 is referred to as a payload segment 65 of frame 56.

Control of communication between system unit 20 with other DTEs 10 through network interface 50 is achieved employing specialized software code, referred to as a communication driver 70. Communication driver 70 is loaded into memory space 26 upon initialization of system unit 20 and generates in memory space 26 two receive rings 72 and 74 that are populated with information concerning first and second sets of buffers 76 and 78.

Figure 4:
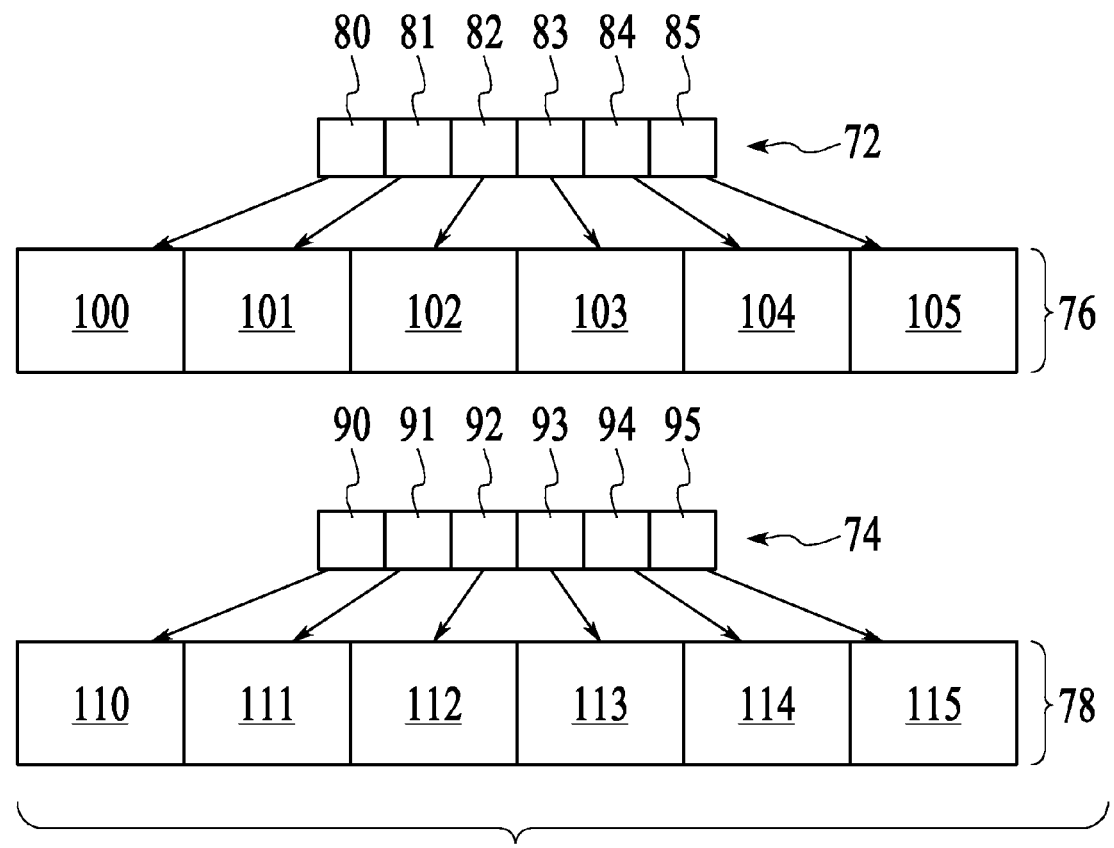
FIG. 4 is a simplified plan view of a mapping of memory space, shown in FIG. 2, in accordance with the present invention.

Referring to both FIGS. 2 and 4, each of receive rings 72 and 74 include a plurality of descriptors 80-85 and 90-95, respectively. Each of descriptors 80-85 identifies individual buffers 100-105 of first set 76, and descriptors 90-95 identify individual buffers 110-115 of second set 78. In the present example, descriptor 80 identifies buffer 100, descriptor 81 identifies buffer 101, descriptor 82 identifies buffer 102, descriptor 83 identifies buffer 103, descriptor 84 identifies buffer 104 and descriptor 85 identifies buffer 105. Descriptor 90 identifies buffer 110, descriptor 91 identifies buffer 111, descriptor 92 identifies buffer 112, descriptor 93 identifies buffer 113, descriptor 94 identifies buffer 114 and descriptor 95 identifies buffer 115. The size of each of buffers 100-105 and 110-115 is a function of the operating system 52 and operating efficiency desired. Although each receive ring 72 and 74 includes six descriptors each having a corresponding buffer, it should be noted that this is for illustration purposes only, and an actual receive ring may have any number of descriptors, and in one embodiment, each receive ring has any number of descriptors desired, dependent upon the application and computing resources available.

Referring to both FIGS. 3 and 4, for example, it is desired that the entire frame 56 be stored among buffers 100-105 and 110-115. However, it has proved advantageous to store header segment 64 in a buffer different from the buffer in which some or all of payload segment 65 is stored, because payload segment 65 may vary in size such that the same may be substantially larger than header segment 64. Header segment 64 typically maintains a size of a couple of hundred bytes of information. As a result, it is useful to provide some of buffers 100-105 and 110-115 with a size capable of storing the anticipated size of the entire payload segment 65 included in frame 56, as well as header segment 64. However, it is also desired to maximize the number of different frames 56 that may be stored in the memory available by first and second sets 76 and 78 while avoiding buffer overflow. This is achieved with the presence of the first and second buffer rings 72 and 74.

Buffers 100-105 of buffer set 76 identified by descriptors 80-85 of first buffer ring 72 may have a common size of approximately 1.5 kilobytes. Buffers 110-115 of buffer set 78 identified by descriptors 90-95 of second buffer ring 74 may have a common size that is larger than the size of buffers 100-105. In one example, the size of buffers 110-115 is the maximum allotted by the operating system, e.g., 4 kilobytes. However, the size of buffers 110-115 may be established to be no greater than the anticipated size of payload segment 65. In this manner, descriptors 80-85 of first buffer ring 72 are employed for header segments 64 and payload segments 65 of frame 56. Descriptors 90-95 are employed for payload segments 65 that may not be properly placed in buffers 100-105.

Referring to FIGS. 2, 3 and 4, typically, descriptors 80-85 define, between adjacent buffers 100-105 in which information of header segment 64 is stored, a predetermined number of buffers 100-105 for storage of information of payload segment 65 corresponding to header segment 64. For example, in one embodiment, buffers 100 and 103 may be reserved for storage of the information in header segment 64 for two different frames 56, as well as the payload segment 65 of respective frames 56 that do not exceed the storage capacity of buffers 100 and 103. In this fashion, buffers 100 and 103 define a first chunk of set 76. Buffers 101and 102 are reserved for the storage of the portion of payload segment 65 that could not be stored by buffer 100, and buffers 104 and 105 are reserved for the storage of the portion of payload segment 65 that could not be stored by buffer 103. Buffers 101, 102, 104 and 105 define a second chunk of set 76, which may be the same size as, as larger as or smaller than either of buffers 100 and 103. For example, buffers 100 and 103 may be sized so as to be just slightly larger than anticipated header segments 64. Buffers 101, 102, 104 and 105, for example, may be 1.5K in size or larger. As a result, descriptors 80 and 83 identify sequential addresses of memory space 26, with the understanding that sequential addresses are addresses that arranged in ascending or descending order. In one embodiment, the sequential addresses may be regularly spaced from one another so that each address identifies a block of memory of uniform size. Descriptors 81, 82, 84 and 85 identify fragmented addresses in memory space, with the understanding that fragmented addresses are addresses that do not designate contiguous memory segments. Thus, in one embodiment, buffers 100-105 may be discontinuous or scattered in memory space 26, although each buffer individually identifies a contiguous block of memory. Assuming a frame 56 is received at network interface 50 with the aggregate size of both header segment 64 and payload segment 65 being no greater than 1.5 kilobytes, then the entire frame 56 may be recorded in first buffer set 76, i.e., in buffer 100 or 103. However, were the aggregate size of both header segment 64 and payload segment 65 greater than 1.5 kilobytes, then header segment 64 and a portion of payload segment 65 would be stored in either buffer 100 or buffer 103, with the remaining portion of payload segment 65 being in either buffers 101-102 or buffers 104-105, respectively. If the remaining payload segment 65 were greater than 3 kilobytes, the portion of payload segment 65 beyond the storage capacity of the aggregate storage capacity of either buffers 101-102 or 104-105 may be stored among one or more buffers 110-115 of second buffer set 78. The descriptor 82 or 85 pointing to the buffer 102 or 105 having the last portion of payload segment 65 in buffer set 76 would set NEXT_RING flag 124 to indicate that the rest of payload segment 65 is located in descriptor 90-95. As described below with reference to FIG. 5, NEXT_RING flag 124 is information corresponding to one of descriptors 90-95 of second ring 74.

Figure 5:
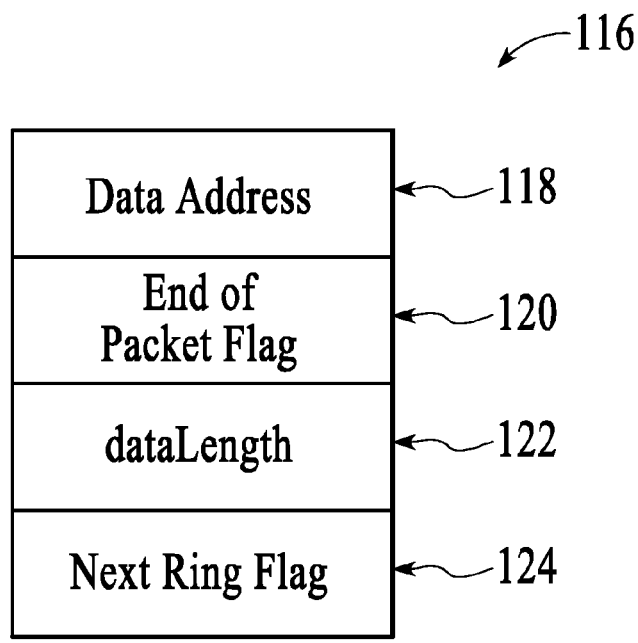
FIG. 5 is a simplified plan view of an example of a descriptor used in memory space, shown in FIG. 2, in accordance with the present invention.
Figure 6:
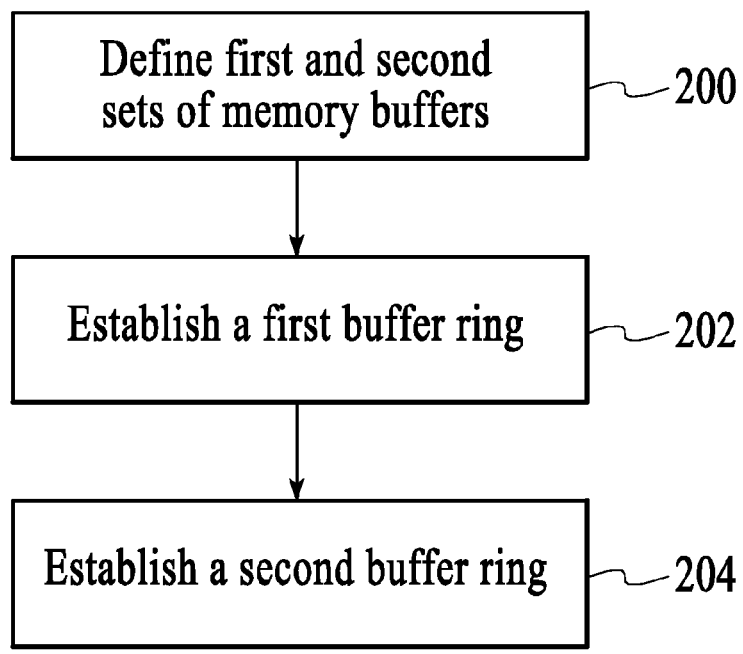
FIG. 6 is a flow diagram showing a process of initializing the mapping, shown in FIG. 4, of the memory space, shown in FIG. 2, in accordance with the present invention.
Figure 7:
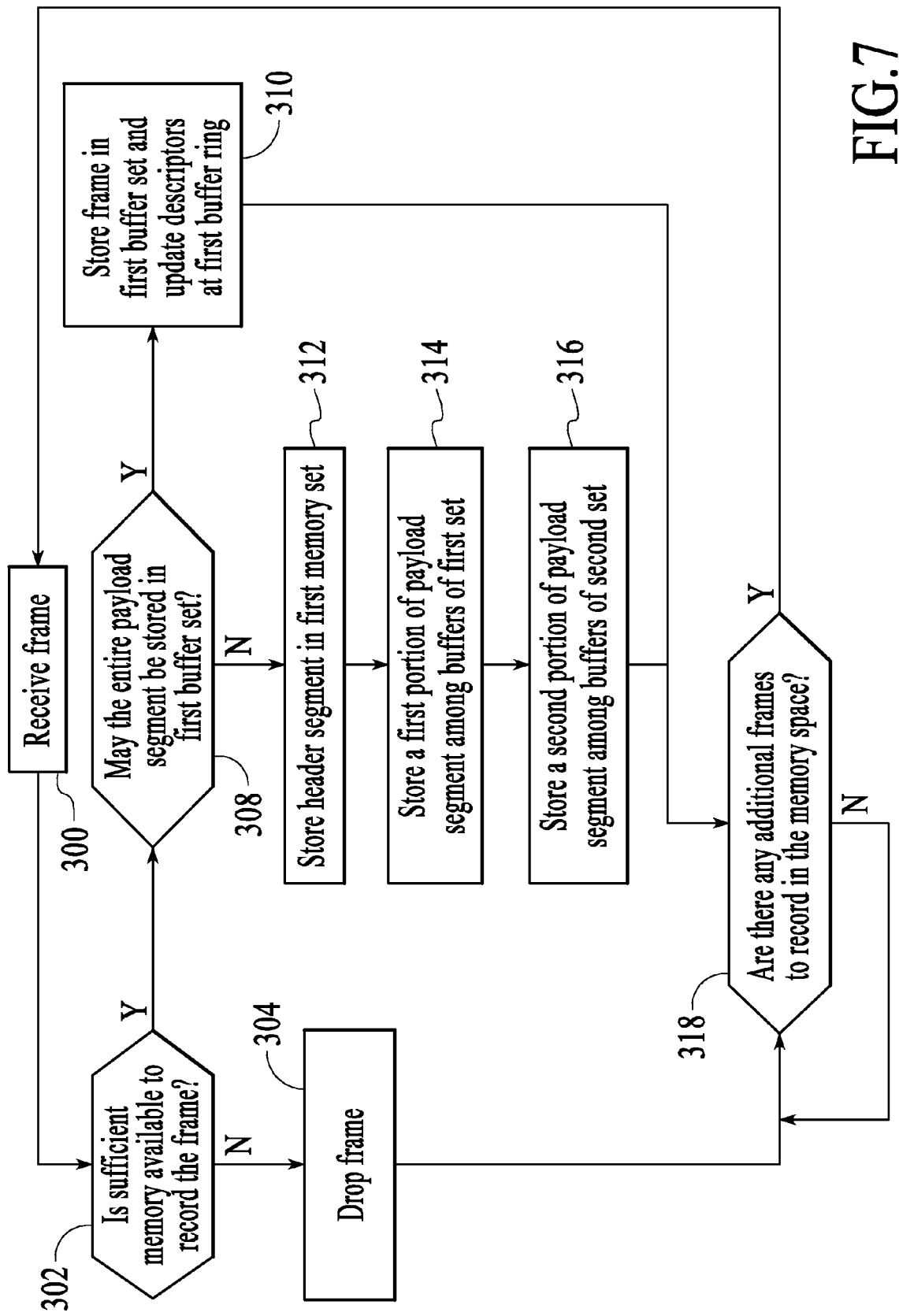
FIG. 7 is a flow diagram showing the operation of receiving the Ethernet frame, shown in FIG. 3, into the memory space, shown in FIG. 2, mapped, as shown in FIG. 4, in accordance with the present invention.
Figure 8:
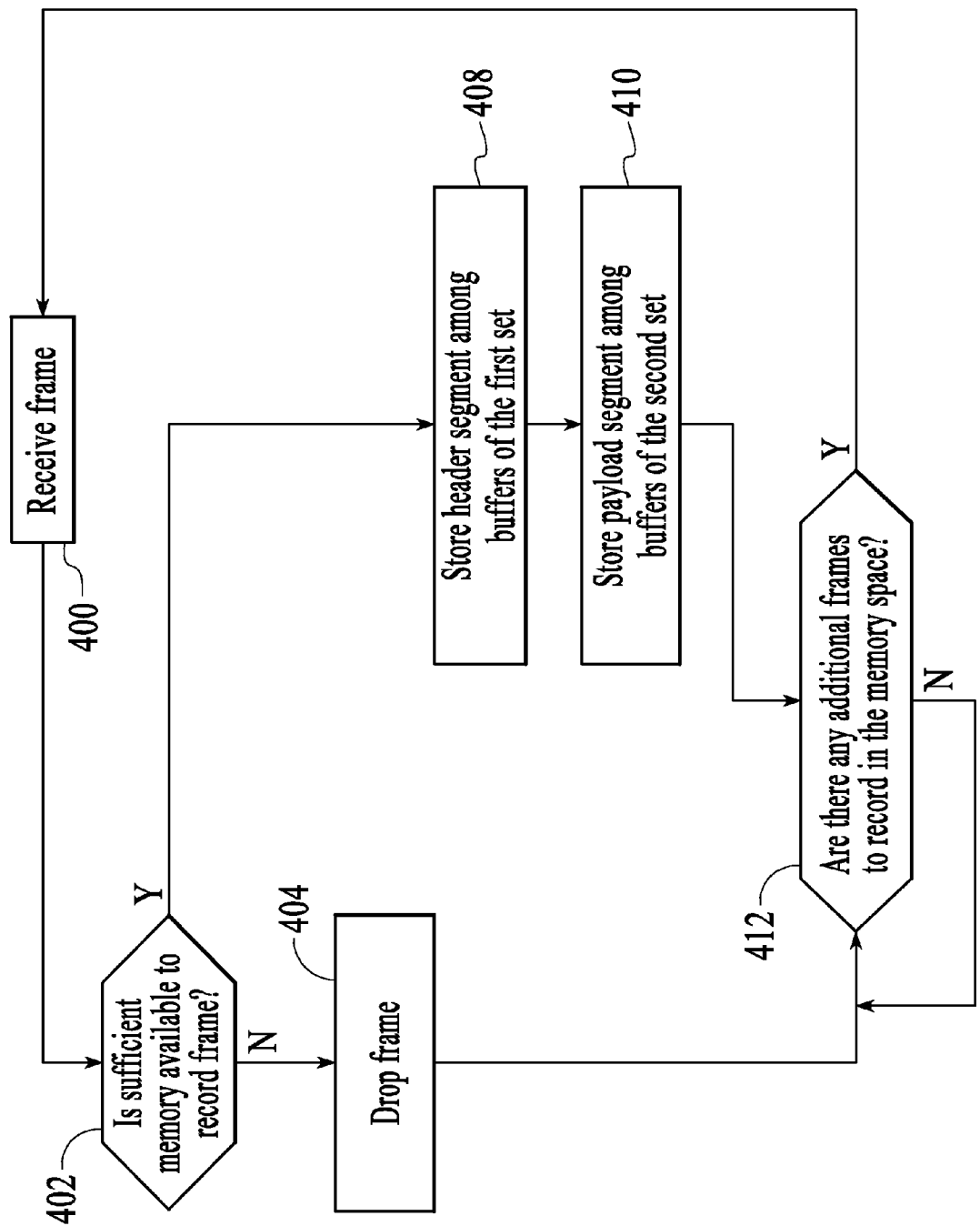
FIG. 8 is a flow diagram showing the operation of receiving the Ethernet frame shown in FIG. 3, into the memory space, shown in FIG. 2, mapped, as shown in FIG. 4, in accordance with an alternate embodiment of the present invention.

FIG. 5 shows, by way of example, a block of information 116 for descriptors 80-85. In this embodiment, block of information 116 includes data address information 118 such as the address of memory space 26 corresponding to one of buffers 100-105 in which portions of header 64 and/or payload segment 65 are stored, the end of packet flag 120 that identifies one of descriptors 80-85 as being the last descriptor for frame 56, a dataLength field 122 that defines the length of data store, and a NEXT_RING flag 124, indicating that a descriptor 90-95 points to a portion of payload segment 65 corresponding to frame 56. It should be understood that the block of information for descriptors 90-95 would be substantially identical to the block of information 116, except for the presence of NEXT_RING flag 124 being omitted and would include data address information corresponding to one of buffers 110-115.

Referring to FIGS. 2-4 and 6, during initialization of system unit 20, communication driver 70 defines first and second sets 76 and 78 of buffers 100-105 and 110-115, respectively at function 200. At function 202, communication driver 70 establishes buffer ring 72 by including a plurality of descriptors 80-85 identifying first set 76 of the plurality of buffers 100-105, with the buffers of the first set 76 having a first size. At function 204, communication driver 70 establishes buffer ring 74 by including a plurality of descriptors 90-95 identifying second set 78 of plurality of buffers 110-115, with the buffers of second set 76 having a second size, which may be larger than or the same size as buffers 100-105. It is also contemplated that the first size is different among the different buffers 100-105 of first set 76. For example, buffers in which the addresses of memory space are linear may comprise a first chunk of the first size, and the buffers 100-105 of fragmented memory addresses may comprise a second chunk of a different size which may be the same as or larger than the size of each of the buffers of the first chunk.

Referring to FIGS. 2-4 and 7, after initialization of buffer rings 72 and 74, as described above with reference to FIG. 6, operation of system unit 20 in response to receiving frame 56 at network interface 50 at function 300, results in network interface 50 determining whether sufficient memory is available among first set 76 to record frame 56, at function 302. This determination is efficiently ascertained by identifying whether any linear portions of first set 76 are available in which to store header segment 64 of frame 56. To that end, start and end data pointers may be compared so that were the start data pointer to identify the next descriptor after the end-data, it may be ascertained that all the descriptors are full. Writing to the next descriptor will over-right the first "read from" descriptor. If sufficient space is not available in first set 76, network interface 50 drops frame 56 at function 304. Following function 304, the process proceeds to function 318, discussed more fully below.

Were it determined at function 302 that sufficient memory is available to store frame 56, then at function 308, network interface 50 determines whether the entire payload segment 65 may be stored in first buffer set 76. If so, at function 310 appropriate descriptors 80-81 of first receive ring 72 are updated to identify where among buffers 100-105 header segment 64 and payload segment 65 are stored. No descriptors 90-95 of second ring 74 are allocated to frame 56, which has a size such that the entire payload segment 65 may be stored among memory buffers 100-105 of first set 76 of memory buffers. Were it determined at function 308 that only a portion of payload segment 65 may be stored among buffers 100-105 of first set 76, then header segment 64, along with a portion of payload segment 65, is stored in one of buffers 110-115 having sequential addresses at function 312. At function 314, a first portion of payload segment 65 is stored among buffers of first set 76. The remaining portions of payload segment 65, i.e., a second portion, is stored among buffers 110-115 of second set 78 at function 316. To that end, one of descriptors 80-85 associated with the buffer 100-105 in which the end of the portion of payload segment 65 recorded in first set 76 is recorded includes NEXT_RING flag descriptor information 124. Thereafter, it would be determined whether there exist any additional frames 56 for recording among first and second buffer sets 76 and 78 at function 318. If there were, the process would return to function 300; otherwise, function 318 repeats. Function 318 is also undertaken following function 310.

Referring to FIGS. 2-4 and 8, in accordance with another embodiment, only header segment 64 is stored in buffers 100-105 of first set 76. Each payload segment 65 of each frame 56 is stored in buffers 110-115 of second set 78. As a result, descriptors 80-85 of first ring 72 identify only header segment 64 information, and descriptors 90-95 of second ring 74 identify only payload segment 65 information. In response to receiving frame 56 at network interface 50 at function 400, network interface 50 determines whether sufficient memory is available among first set 76 to record header segment 64 of frame 56, at function 402, as discussed above. If sufficient space is not available in first set 76, network interface 50 drops frame 56 at function 404. Following function 404, the process proceeds to function 412, discussed more fully below. Were it determined at function 402 that sufficient memory is available to store frame 56, then at function 408, network interface 50 identifies the appropriate descriptors 80-85 of first receive ring 72 in order to identify where among buffers 100-105 header segment 64 is stored. At function 410, network interface 50 identifies the appropriate descriptors 90-95 of second receive ring 74 in order to identify where among buffers 110-115 header segment 64 is stored. Thereafter, it would be determined whether there exist any additional frames 56 for recording among first and second buffer sets 76 and 78 at function 412. If there were, the process would return to function 400; otherwise, function 412 repeats.

It should be understood that buffers 110-115 may be established to have a size that is the same as, as small as, or larger than buffers 100-105. However, it is also conceivable that the size of buffers 110-115 may be arbitrarily determined based upon the size of payload segment 65. As a result, during function 410, network interface 50 may establish a single descriptor 90-95 to identify memory addresses among second set 78 that are different from the memory addresses established in the same descriptor upon initialization of system unit 20. While it is conceivable that the entire address space associated with second set 78 may be used to store a single payload segment 65, typically, the size of the address space identified by one of descriptors 90-95 is delimited by operating system 52. As a result, it is possible that a single payload segment 65 may be stored among two or more buffers 110-115 of different sizes, one of which may be the maximum size permitted by operating system 52, with the remaining buffers 110-115 being smaller than the maximum size permitted by operating system 52.

The embodiments of the present invention described above are exemplary. Many changes and modifications may be made to the disclosure recited above while remaining within the scope of the invention. For example, the present examples discuss two receive rings. However, receive rings in addition to the two receive rings discussed above may be included. Additionally, the present invention may be implemented in software, firmware or as an abstract of a physical computer system known in the art as a virtual machine or a combination of software, firmware and a virtual machine. With respect to implementing the present invention as a virtual machine, expression of the invention may be either as virtual system hardware, guest system software of the virtual machine or a combination thereof. The scope of the invention should, therefore, be limited not to the above description, but instead should be determined with reference to the appended claims along with their full scope of equivalents.

What is claimed is:

1. A memory buffer management method comprising:
  establishing a first receive ring having a first plurality of descriptors, each descriptor of the first receive ring identifying a respective buffer belonging to a first set of buffers;
  establishing a second receive ring having a second plurality of descriptors, each descriptor of the second receive ring identifying a respective buffer belonging to a second set of buffers;
  storing a header segment of a data packet in a first buffer of the first set;
  reserving one or more additional buffers of the first set for storing portions of a payload segment of the data packet, the first buffer and the one or more additional buffers of the first set having sequential addresses in memory; and
  determining whether the payload segment is too large to be stored in the reserved additional buffers, and storing only remaining portions of the payload segment of the data packet in one or more buffers of the second set when the payload segment is too large to be stored in the reserved additional buffers, the one or more buffers of the second set having fragmented addresses in the memory.

2. The method of claim 1 wherein the first plurality of descriptors identify first and second chunks of buffers, the second chunk comprising the reserved additional buffers, the first chunk including multiple buffers of the first set, the remaining buffers of the first set being included in the second chunk, each of the remaining buffers of the second chunk being larger than each of the multiple buffers of the first chunk, wherein the storing of the header segment includes storing the header segment and a first portion of the payload segment in one buffer from the first chunk of buffers, the method further comprising
  storing additional portion of the payload segment among buffers in the reserved additional buffers of the second chunk.

3. The method of claim 2, further comprising:
  storing the remaining portions of the payload segment in the second set of buffers when a storage capacity among the reserved additional buffers in the second chunk is exhausted without completely storing the payload segment in the first and second chunk of buffers.

4. The method as recited in claim 1, further including receiving multiple packets of data, each of the packets of data including a header segment and a payload segment, and storing the header segments in said first set, and storing only a portion of the payload segments in said second set.

5. The method as recited in claim 1, further including receiving multiple packets of data, each of the packets of data including a header segment and a payload segment, and storing the header segments in said first set, and storing only a portion of the payload segments in said second set.

6. The method of claim 1, further comprising:
  receiving multiple packets of data, each of the packets of data including a header segment and a payload segment;
  storing the header segments in the first set;
  storing only a portion of the payload segments in the second set, when the payload segments is larger than twice the size of the first buffer in the first set; and
  storing the payload segments in the first set and not in the second set when the payload segment is not larger than twice the size of one of the buffers of the first set.

7. A non-transitory computer readable storage medium embodying computer software implementing a method for memory buffer management in a computer, the method comprising:
  establishing a first receive ring having a first plurality of descriptors, each descriptor of the first receive ring identifying a respective buffer belonging to a first set of buffers, said first set of buffers of having sequential addresses in a memory;
  designating a first buffer in the first set to store a header segment of a data packet;
  determining a size of the first buffer based on a size of the header segment;
  establishing a second receive ring having a second plurality of descriptors, each descriptor of the second receive ring identifying a respective buffer belonging to a second set of buffers, the second set of buffers having fragmented addresses in the memory;
  reserving one or more additional buffers of said first set for storing portions of the payload segment of the data packet;
  storing the header segment of the data packet in the first buffer of the first set;
  determining the payload segment is too large to be stored in the reserved additional buffers; and
  based on determining the payload segment is too large to be stored in the reserved additional buffers, storing remaining portions of the payload segment for the data packet in a buffer of the second set.

8. The medium of claim 7, wherein;
  the plurality of descriptors identify first and second chunks of buffers, the second chunk comprising the reserved additional buffers;

the first chunk includes multiple buffers of the first set, the remaining buffers of the first set being included in the second chunk;

the storing of the header segment includes storing the header segment and a first portion of the payload segment in one or more buffers in the first chunk of buffers; and the method further comprising storing additional portions of the payload segment among buffers in the reserved additional buffers of the second chunk.

9. The medium of claim 8 wherein each of the multiple buffers of the first chunk are smaller in storage capacity than each of the second chunk.

10. The medium of claim 7, wherein the storing of the remaining portions of the payload segment of the data packet in the buffer of the second set further comprises sizing the buffer of the second set according to a quantity of data of the portion of the payload segment to be stored in the buffer of the second set.

11. The medium of claim 7, wherein the method further comprises receiving multiple packets off data, each of the packets of data including a header segment and a payload segment, and storing the header segments in said first set, and storing the payload segments in said second set.

12. The medium of claim 7, wherein the method further comprises receiving multiple packets of data, each of the packets of data including a header segment and a payload segment, and storing the header segments in said first set, and storing a portion of the payload segments in said second set.

13. The medium of claim 7, wherein the method further comprises receiving multiple packets of data, each of the packets of data including a header segment and a payload segment, and storing the header segments in the first set, and storing a portion of the payload segments in the second set when the payload segments are larger than twice the size of one of the buffers of the first set, and storing the payload segments in the first set when the payload segment is not larger than twice the size of one of the buffers of the first set.

14. A data packet processing system, said system comprising:

a memory space having first and second receive rings with a plurality of descriptors, a first group of the descriptors being contained in the first receive ring, the first group of descriptors identifying the first set of buffers, and a second group of the descriptors contained in said second receive buffer ring the second group of descriptors identifying a second set of buffers, the first set of buffers having sequential addresses in memory, the second set of buffers having fragmented address in the memory; and a communication drive;

to associate, by a processor, said first and second sets of buffers with said first and second receive rings so that at least one buffer of the first set of buffers has a size that is different from a size of each buffer of the second set of buffers;

to designate buffers of the first set having a first size for storing at least a header segment of a data packet; and to reserve one or more additional buffers of the first set for storing portions of the payload segment of the data packet; and wherein the space for the first and second sets of buffers is allocated such that the buffers of the second set are employed for storing portions of a payload segment for a data packet only when the payload segment is too large to be stored in the reserved buffers of said first set of buffers.

15. The data packet processing system of claim 14, further including a network interface in data communication with the communication driver, the network interface being configured to:

receive a data packet having a header segment and a payload segment;

record, in a first descriptor of said second ring, a location of the payload segment;

record, in a first descriptor of said first ring, a location of said header segment; and set a NEXT_RING flag, the NEXT_RING flag indicating when set that additional payload data is provided in the second set of buffers.

16. The data packet processing system of claim 14, further including a network interface in data communication with the communication driver, the network interface being configured to:

receive a data packet having a header segment and a payload segment;

record, in a first descriptor of the second ring, a location of a first portion of the payload segment;

record, in a first descriptor of the first ring, a location of a second portion of the payload segment and a pointer to the first descriptor of the second ring;

set a NEXT_RING flag, the NEXT_RING flag indicating that a location of the first portion of the payload segment is identified on the second ring.

17. A data packet processing system, said system comprising:

a memory space having first and second receive rings having a plurality of descriptors, a first group of the descriptors being contained in the first receive ring and identifying a first set of buffers, and a second group of the descriptors being contained in the second receive ring and identifying a second set of buffers;

a communication driver in data communication with said network interface, the communication driver associating the first and second sets of buffers with the first and second receive buffer rings respectively, the communication driver configuring the first and second sets of buffers so that each buffer of the second set of buffers is larger than one buffer of the first set buffers, the communications driver designating the one buffer of the first set for storing at least a header segment of a data packet, and reserving one or more buffers of said first set for storing portions of the payload segment of the data packet; and a network interface configured to:

receive a data packet having a header segment and a payload segment; and drop the data packet if the one buffer of the first set of buffers does not have sufficient space available for the first header segment; and if the one buffer of the first set of buffers does have sufficient space available for the first header segment;

storing the header segment in the one buffer of the first set of buffers; and in response to determining said payload segment of the received data packet is larger than a capacity of the reserved buffers of said first set, recording in at least one descriptor of the first receive ring a location of a first portion of the payload segment and recording in at least one descriptor of the second receive ring a location of a second portion of the payload segment.

18. The data packet processing system of claim 17, wherein the buffers of the first set of buffers are divided into first and second chunks of buffers, each of the buffers belonging to the second chunk being larger than each belonging to the buffers of the first chunk.

19. The data packet processing system as recited in claim 18, wherein each buffer in the second chunk of buffers is the same size as one of the buffers of said second set.

20. The data packet processing system as recited in claim 19 wherein said first portion is located among said second chunks disposed between a pair of adjacent first chunks.

21. A memory buffer management method comprising:
establishing a first receive ring having a plurality of descriptors identifying a first set of buffers;
designating at least one of the buffers in the first set of buffers for storing at least a header segment of a data packet;
reserving one or more buffers of the first set of buffers for storing portions of a payload segment of the data packet;
defining a second receive ring having a plurality of descriptors identifying a second set of buffers, each buffer of the second set of buffers is larger than the at least one buffer in the first set buffers; and
receiving a first packet of data, the first packet of data including a first header segment and a first payload segment;
upon determining that the at least one of the buffers in the first set of buffers does not have sufficient space available for the first header segment, dropping the first packet of data;
receiving a second packet of data, the second packet of data including a second header segment and a second payload segment;
upon determining that the at least one of the buffers in the first set of buffers has sufficient space available for the second header segment, storing the second header segment in the designated buffer in the first set of buffers, storing a first portion of the second payload segment in the first set of buffers and storing a second portion of the second payload segment in the second set of buffers.

22. The method of claim 21, wherein the second portion of the second payload segment is stored in one of the buffers of the second set, the one buffer being sized to accommodate the second portion.

23. The method as recited in claim 21, further comprising:
receiving multiple packets of data, each of the packets including a header segment and a payload segment;
defining a plurality of header segments and a plurality of payload segments;
storing each of the header segments in the first set; and
storing a portion of at least one of the payload segments in the second set.

24. The method of in claim 21, further comprising:
receiving multiple packets of data, wherein each of the multiple packets of data includes a corresponding header segment and payload segment;
storing each of the header segments in the first set; and
storing a portion of said each payload segments in the second set, when the payload segment is larger than twice the size of one of the buffers of said first set with the payload segments associated with the remaining packets of said multiple packets being stored in said first set.

25. A non-transitory computer readable storage medium embodying computer software implementing a method for memory buffer management in a computer, the method comprising:
establishing a first receive ring having a plurality of descriptors identifying a first set of buffers, the first set of buffers having sequential addresses in memory;
designating at least one of the buffers in the first set of buffers for storing at least a header segment of a data packet;
defining a second receive ring having a plurality of descriptors identifying a second set of buffers, the second set of buffers having fragmented addresses in the memory; and
receiving a packet of data, the packet including a header segment and a payload segment, storing said header segment in one of the designated buffers in the first set of buffers, storing a first portion of said payload segment in the first set of buffers and storing a second portion of the payload segment in the second set of buffers.

26. The medium of claim 25, wherein the second portion of the payload segment is stored in just one of the buffers of the second set, the one buffer being sized to accommodate the second portion.

27. The medium of claim 25, wherein the method further comprises:
receiving multiple packets of data, each of the packets including a header segment and a payload segment;
storing each of the of header segments in the first set, and storing a portion of at least one of the payload segments in the second set.

28. The medium of claim 25, wherein the method further comprises:
receiving multiple packets of data, wherein each of the multiple packets of data includes a corresponding header segment and payload segment;
storing each of the header segments in the first set; and
storing a portion of said each payload segments in the second set when the payload segment is larger than twice the size of one of the buffers of said first set, with the payload segments associated with the remaining packets of said multiple packets being stored in only the first set.

29. A memory buffer management method comprising:
establishing a receive ring having a plurality of descriptors identifying a set of buffers, the set including a first subset of buffers each having a first size, the first size being based on a size of a header segment of a data packet;
storing only a header segments of the data packet in a first buffer in the first subset of buffers;
allocating space in memory for the buffers of the first subset such that the buffers of the first subset have sequential addresses in the memory space; and
reserving one or more buffers in a second subset of the set buffers, each of the buffers of the second subset having a size different from the first size, the buffers of the second subset being reserved for storing portions of the payload segments of the received data packets, wherein the memory space for the reserved buffers are allocated such that the reserved buffers have fragmented addresses in the memory space.

* * * * *